(12) United States Patent
Esumi (10) Patent No.: US 11,792,343 B2
(45) Date of Patent: Oct. 17, 2023

(54) IMAGE READING APPARATUS, IMAGE FORMING SYSTEM, CURL AMOUNT CALCULATION METHOD, AND STORAGE MEDIUM COMPRISING A CONVEYOR, A READER AND A FIRST HARDWARTE PROCESSOR THAT CALCULATES A BLUR AMOUNT OF AN EXTRACTED EDGE AND CALCULATES A CURL AMOUNT OF A SHEET BASED ON THE CALCULATED BLUR AMOUNT

(71) Applicant: Konica Minolta, Inc., Tokyo (JP)

(72) Inventor: Yoshihiro Esumi, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/933,144

(22) Filed: Sep. 19, 2022

(65) Prior Publication Data
US 2023/0106997 A1    Apr. 6, 2023

(30) Foreign Application Priority Data

Oct. 1, 2021   (JP) ................ 2021-162471

(51) Int. Cl.
  *H04N 1/00*    (2006.01)
  *B41J 11/00*   (2006.01)
  *B41J 11/42*   (2006.01)
  *H04N 1/23*    (2006.01)

(52) U.S. Cl.
  CPC ...... *H04N 1/00726* (2013.01); *B41J 11/0005* (2013.01); *B41J 11/42* (2013.01); *H04N 1/00602* (2013.01); *H04N 1/00644* (2013.01); *H04N 1/00647* (2013.01); *H04N 1/00708* (2013.01); *H04N 1/00737* (2013.01); *H04N 1/00748* (2013.01); *H04N 1/00763* (2013.01); *H04N 1/00795* (2013.01); *H04N 1/2323* (2013.01)

(58) Field of Classification Search
  CPC ... B41J 11/0005; B41J 11/42; G03G 15/6576; H04N 1/00602; H04N 1/00644; H04N 1/00647; H04N 1/00708; H04N 1/00726; H04N 1/00737; H04N 1/00748; H04N 1/00763; H04N 1/00795; H04N 1/2323
  USPC ........... 358/498, 1.11–1.18, 3.26, 3.27, 3.28; 399/406; 162/270; 271/161, 188, 209
  See application file for complete search history.

(56) References Cited

U.S. PATENT DOCUMENTS

2016/0301811 A1* 10/2016 Yamaguchi ............ H04N 1/605
2016/0337529 A1* 11/2016 Kubota .............. H04N 1/00068

FOREIGN PATENT DOCUMENTS

| JP | 2016157059 A | * | 9/2016 | ............ G06K 15/00 |
| JP | 2020-134750 A | | 8/2020 | |
| JP | 2020134750 A | * | 8/2020 | |

* cited by examiner

*Primary Examiner* — Chad Dickerson
(74) *Attorney, Agent, or Firm* — BakerHostetler (57) ABSTRACT

An image reading apparatus including: a conveyor that conveys a sheet on which an image is formed by an image forming apparatus; a reader that reads the sheet conveyed by the conveyor, by using a contact image sensor; and a first hardware processor that extracts an edge of the sheet by analyzing a read image by the reader, calculates a blur amount of the edge based on the extracted edge, and calculates a curl amount of the sheet based on the calculated blur amount.

10 Claims, 10 Drawing Sheets

IMAGE READING APPARATUS, IMAGE FORMING SYSTEM, CURL AMOUNT CALCULATION METHOD, AND STORAGE MEDIUM COMPRISING A CONVEYOR, A READER AND A FIRST HARDWARTE PROCESSOR THAT CALCULATES A BLUR AMOUNT OF AN EXTRACTED EDGE AND CALCULATES A CURL AMOUNT OF A SHEET BASED ON THE CALCULATED BLUR AMOUNT

CROSS-REFERENCE TO RELATED APPLICATIONS

This application claims priority to Japanese Patent Application No. 2021-162471 filed on Oct. 1, 2021, the entire disclosure of which is incorporated herein by reference.

BACKGROUND

Technological Field

The present invention relates to an image reading apparatus, an image forming system including the image reading apparatus, a curl amount calculation method, and a storage medium.

Description of the Related Art

In general, the image forming apparatus may cause the sheet of paper to curl when the fixing device applies heat to the paper or when the paper passes through a transport path that is not straight. In addition, paper fed in preparation for image formation may be transported in a curled state.

Curled paper can degrade print quality, cause poor loading, and make it difficult to properly perform subsequent post-processing such as binding. Therefore, a conventional method has been proposed to read image-formed paper and detect curl of the paper based on the reading results (for example, JP 2020-134750 A).

SUMMARY

However, the configuration described in the above-mentioned JP 2020-134750 A uses the CCD (Charge Coupled Device) method as the configuration for reading images. This is a complex structure that places a mirror that reflects light between the paper and the sensor (CCD), resulting in a high price and a large size of the device.

An object of the present invention is to provide an image reading apparatus, an image forming system including the image reading apparatus, a curl amount calculation method, and a storage medium, capable of accurately detecting sheet curl while achieving cost reduction and downsizing of the equipment.

To achieve at least one of the abovementioned objects, according to an aspect of the present invention, an image reading apparatus reflecting one aspect of the present invention is an image reading apparatus including: a conveyor that conveys a sheet on which an image is formed by an image forming apparatus; a reader that reads the sheet conveyed by the conveyor, by using a contact image sensor; and a first hardware processor that extracts an edge of the sheet by analyzing a read image by the reader, calculates a blur amount of the edge based on the extracted edge, and calculates a curl amount of the sheet based on the calculated blur amount.

To achieve at least one of the abovementioned objects, according to another aspect of the present invention, an image forming system reflecting one aspect of the present invention is an image forming system including: an image forming apparatus that forms an image on a sheet; the image reading apparatus according to claim 1 that reads the sheet on which the image is formed by the image forming apparatus; and a post-processing apparatus that corrects a curl of the sheet read by the image reading apparatus.

To achieve at least one of the abovementioned objects, according to another aspect of the present invention, a curl amount calculation method reflecting one aspect of the present invention is a curl amount calculation method of an image reading apparatus including: a conveyor that conveys a sheet on which an image is formed by an image forming apparatus; and a reader that reads the sheet conveyed by the conveyor by using a contact image sensor, the curl amount calculation method including controlling that is extracting an edge of the sheet by analyzing a read image by the reader, calculating a blur amount of the edge based on the extracted edge, and calculating a curl amount of the sheet based on the calculated blur amount.

To achieve at least one of the abovementioned objects, according to another aspect of the present invention, a storage medium reflecting one aspect of the present invention is a non-transitory computer-readable storage medium storing a program for a computer of an image reading apparatus including: a conveyor that conveys a sheet on which an image is formed by an image forming apparatus; and a reader that reads the sheet conveyed by the conveyor by using a contact image sensor, the program causing the computer to perform controlling that is extracting an edge of the sheet by analyzing a read image by the reader, calculating a blur amount of the edge based on the extracted edge, and calculating a curl amount of the sheet based on the calculated blur amount.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION OF EMBODIMENTS

Hereinafter, embodiments of the present invention will be described in detail with reference to the drawings. However, the scope of the invention is not limited to the disclosed embodiments or illustrated examples.

Figure 1:
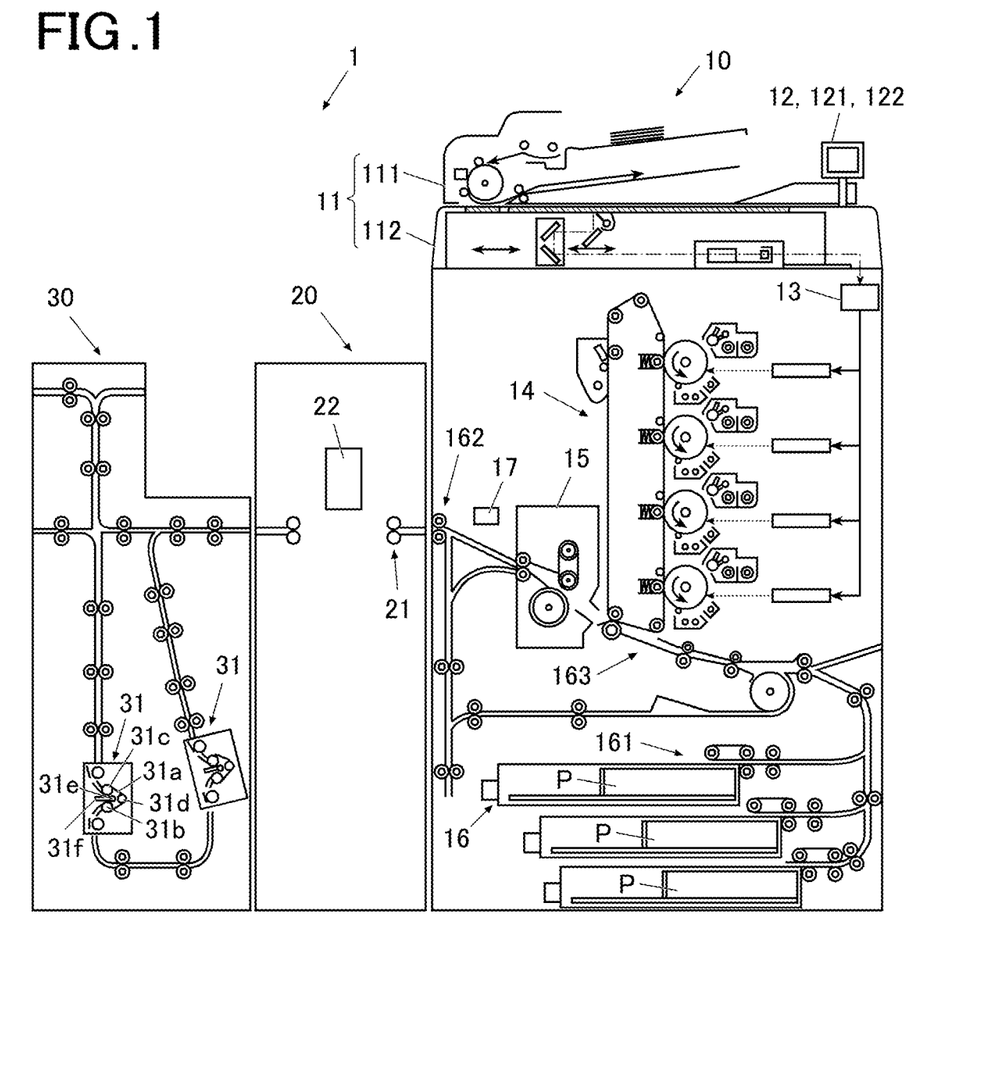
FIG. 1 is a view showing a schematic configuration of an image forming system in an embodiment.

The image forming system 1 in the embodiment includes an image forming apparatus 10, an image reading apparatus 20 connected to the post stage of the image forming apparatus 10, and a post-processing apparatus 30 connected to the post stage of the image reading apparatus 20, as shown in FIG. 1.

The image forming apparatus 10 is an apparatus that forms color images by intermediate transfer method using electrophotographic process technology. The image forming apparatus 10 uses a vertical tandem system in which photosensitive drums corresponding to the four YMCK colors are arranged in series in the running direction of the intermediate transfer belt (i.e., in the vertical direction), and each color toner image is sequentially transferred to the intermediate transfer belt in a single procedure. The image forming apparatus 10 forms images by primary transfer of the Y (yellow), M (magenta), C (cyan), and K (black) color toner images formed on the photosensitive drum to the intermediate transfer belt, overlapping the four color toner images on the intermediate transfer belt, and then secondary transfer to the sheet of paper P.

Figure 2:
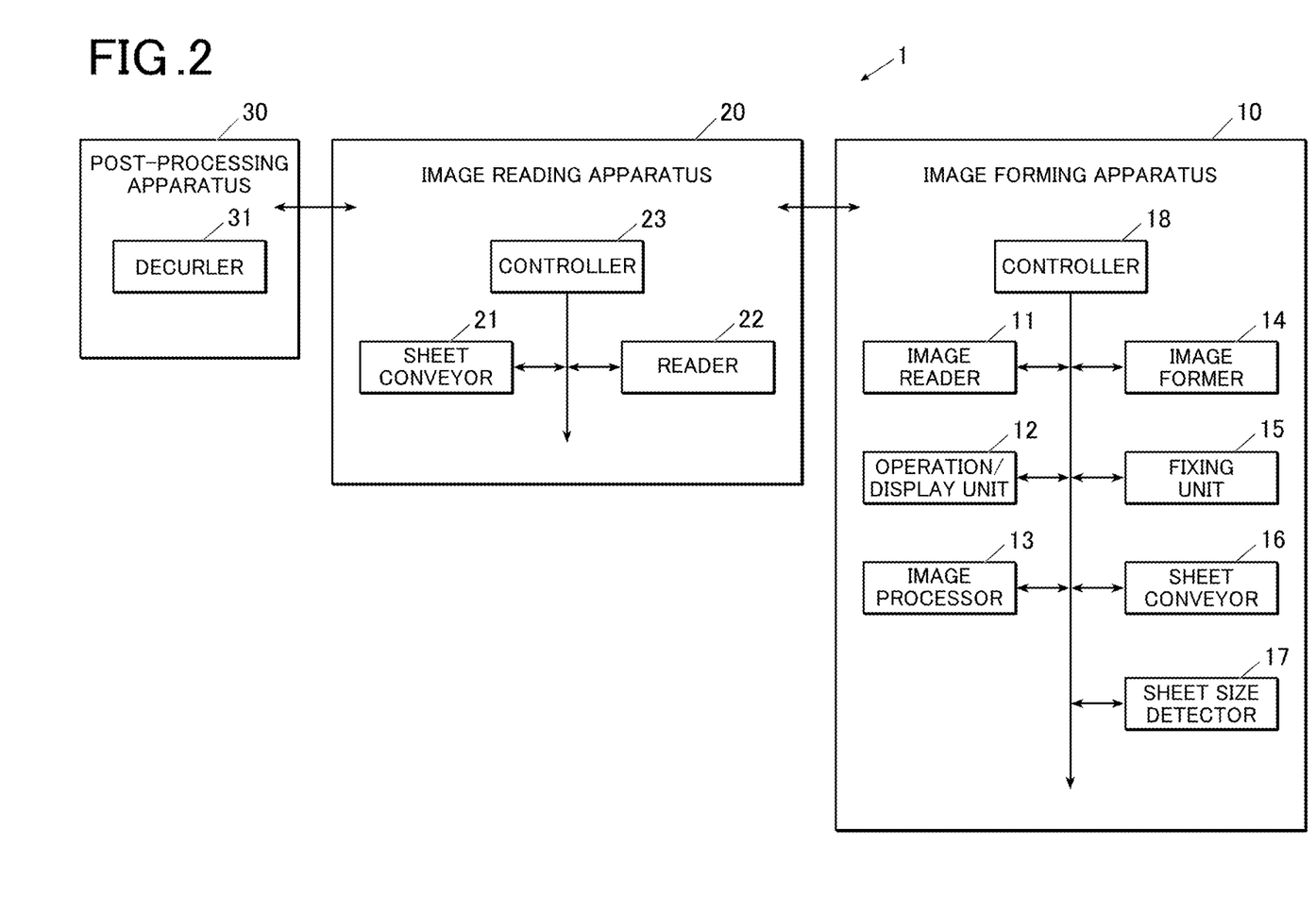
FIG. 2 is a functional block diagram showing a control structure of the image forming system in the embodiment.

The image forming apparatus 10 includes an image reader 11, an operation/display unit 12, an image processor 13, an image former 14, a fixing unit 15, a sheet conveyor 16, a sheet size detector 17, and a controller 18 (second hardware processor, third hardware processor), as shown in FIG. 1 and FIG. 2.

The image reader 11 consists of an automatic document feeder 111 which feeds the document placed on the document tray to a document image scanner 112 by means of a transport mechanism, the document image scanner 112 that optically scans the document that is fed from the automatic document feeder 111 onto the contact glass or placed on the contact glass and reads the document image formed on the document, etc. The image reader 11 generates input image data of the document image based on the reading result by the document image scanner 112 and outputs it to the image processor 13.

The operation/display unit 12 is realized, for example, as a liquid crystal display (LCD) with a touch panel and functions as a display 121 and an operation unit 122. The display 121 displays various operation screens, image status or operation status of each function, etc., according to the display control signals input from the controller 18. The operation unit 122 is equipped with various operation keys, such as a numeric keypad and start key, and accepts various input operations by the user, generates operation signals, and outputs them to the controller 18.

The image processor 13 is equipped with a circuit that performs digital image processing on the input image data according to the initial settings or user settings. The image processor 13 performs various correction processes, such as tone correction, color correction, shading correction, etc., and compression processing on the input image data.

The image former 14 forms images with colored toners of respective Y, M, C, and K components based on input image data that has undergone various types of digital image processing. The image former 14 is equipped with a photosensitive drum, a charging device, an exposure device, a developer, and an intermediate transfer device. First, the surface of the photosensitive drum is uniformly charged by the corona discharge of the charging device. Next, the exposure device emits a laser beam corresponding to the image of each color component onto the photosensitive drum, thereby forming an electrostatic latent image of each color component on the surface of the drum. Next, the developer causes the toner of each color component to be supplied to the surface of the photosensitive drum, and the electrostatic latent image is visualized to form a toner image. The formed toner image is transferred to the sheet P by an intermediate transfer device.

The fixing unit 15 fixes the toner image on the sheet P by heating and pressurizing the toner image transferred on the sheet P.

The sheet conveyor 16 is composed of a sheet feeder 161, a sheet ejector 162, a conveyance path 163, etc. The sheet feeder 161 accommodates the sheet P for each predetermined type based on the basis weight, size, etc. of the sheet P. The sheet ejector 162 ejects the sheet P, on which the image is formed, out of the machine. The conveyance path 163 conveys the sheet P stored in the sheet feeder 161 or the sheet P with an image formed on either side of the front or the back.

The sheet size detector (detector) 17 is a sensor located on the conveyance path 163 and detects the size of the sheet as it passes. The sheet size detector 17 outputs the detection results to the controller 18.

The controller 18 consists of a CPU, RAM, ROM, etc. The CPU reads various processing programs stored in ROM and expands them into RAM in response to operation signals input from the operation unit 122, etc., and controls the operation of the image forming apparatus 10 comprehensively in cooperation with the various programs expanded in RAM.

The image reading apparatus 20 reads the sheet on which the image is formed by the image forming apparatus 10.

Figure 3:
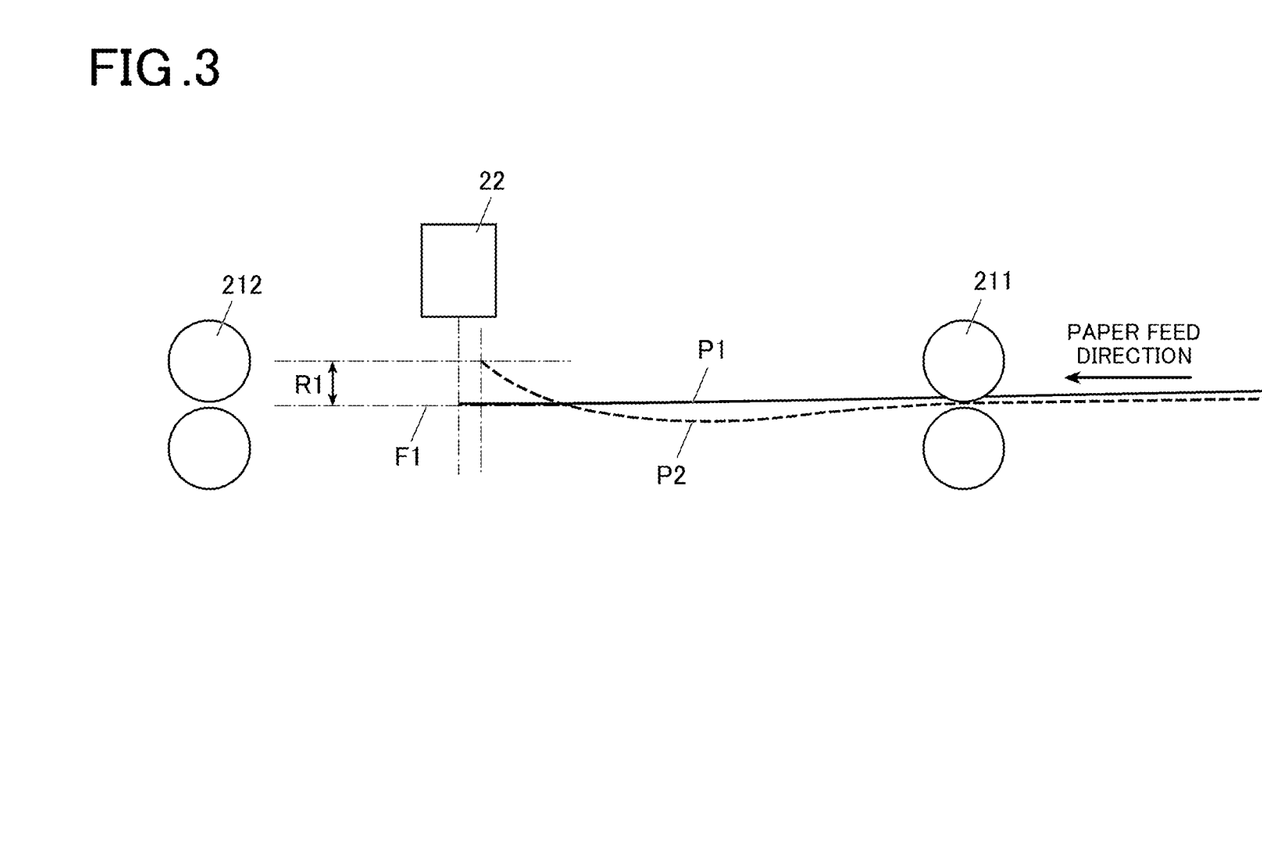
FIG. 3 is a view showing an example of how the leading end of the sheet is read by a reader.

The image reading apparatus 20 consists of a sheet conveyor 21, a reader 22, and a controller 23 (first hardware processor, second hardware processor), as shown in FIGS. 1 to 3.

The sheet conveyor 21 is composed of upstream conveyance rollers 211 located upstream of the reader 22 in the conveyance direction and downstream conveyance rollers 212 located downstream of the reader 22 in the conveyance direction, and conveys the sheet on which the image is formed by the image forming apparatus 10. In other words, the sheet conveyor 21 functions as the conveyor of the present invention. The upstream conveyance rollers 211 and the downstream conveyance rollers 212 function as the conveyance rollers of the present invention, which hold the sheet therebetween and convey the sheet. The sheet conveyor 21 conveys the sheet at the height of the focus position of the reader 22. In other words, the sheet that is not curled is to be read at the focus position of the reader 22.

The reader 22 reads the sheet conveyed by the sheet conveyor 21. The reader 22 is a contact image sensor (CIS). In general, CIS is cheaper and smaller than CCD, and have a shallower depth of focus. As a result, the focus range is narrow and a slight curl causes a blurred image.

FIG. 3 shows an example of how the leading end of the sheet is read by the reader 22. In the figure, P1 is the sheet with an uncurled leading end, and P2 is the sheet with a curled leading end. In FIG. 3, reference mark F1 indicates the height of the focus position of the reader 22 and reference mark R1 indicates the curl amount, respectively.

Figure 4A:
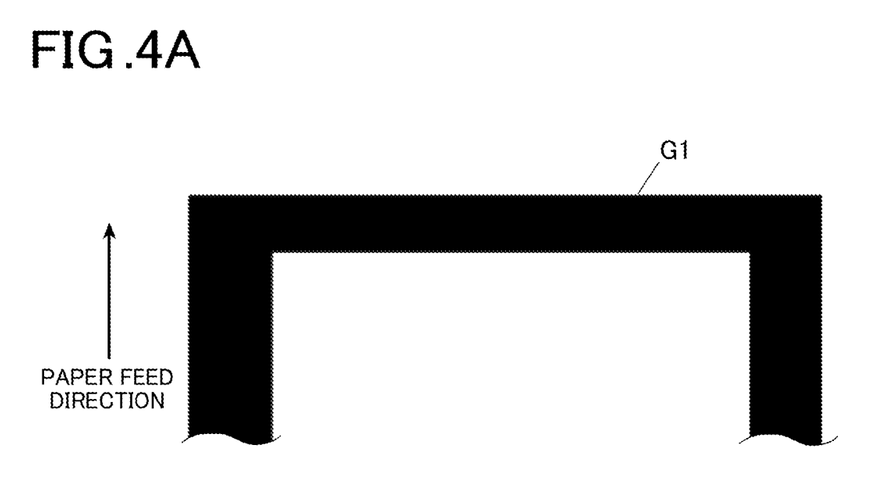
FIGS. 4A and 4B are views showing examples of images read by the reader.
Figure 4B:
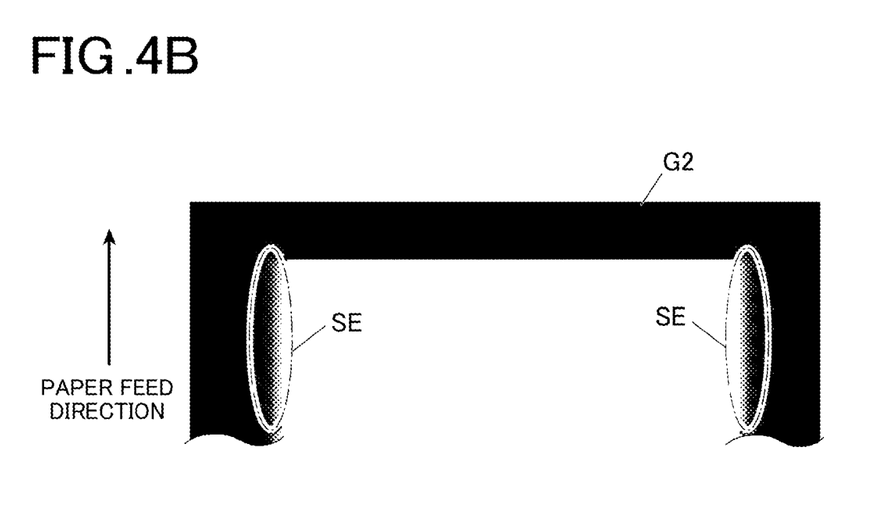

FIGS. 4A and 4B show examples of images read by the reader 22. FIG. 4A is an image G1 in which the leading end of the sheet P1 is read without curling of the leading end, and FIG. 4B is an image G2 in which the leading end of the sheet P2 is read with curling of the leading end.

When the leading end of the sheet P1 is read without curling of the leading end, it is read at the focus position of the CIS, resulting in a blur-free image on all sides (see FIG. 4A). On the other hand, when the leading end of the sheet P2 with a curled leading end is read, the leading end is read at the position deviated from the focus position of CIS, resulting in an image with a blurred edge at the sheet leading end (especially, side edge portions (see the reference mark SEs) (see FIG. 4B). When the curled sheet is read, the blur gradually becomes stronger toward the ends in conveyance direction (leading or rear end) of the sheet.

The controller 23 consists of a CPU, RAM, ROM, and other components. The CPU reads the various processing programs stored in ROM and expands them into RAM, and then controls the operation of the image reading apparatus 20 comprehensively in cooperation with the various programs expanded in RAM. For example, the controller 23 analyzes the image read by the reader 22 to extract the edge of the sheet, calculates the blur amount of the edge based on the extracted edge, and calculates the curl amount of the sheet based on the calculated blur amount.

Specifically, the controller 23 first calculates the blur amount using the first derivatives of tone values near the edge. The term "near the edge" refers to pixels within a predetermined range (e.g., about 5 pixels around the edge) that includes the edge, which is necessary for the calculation of the blur amount.

Figure 5A:
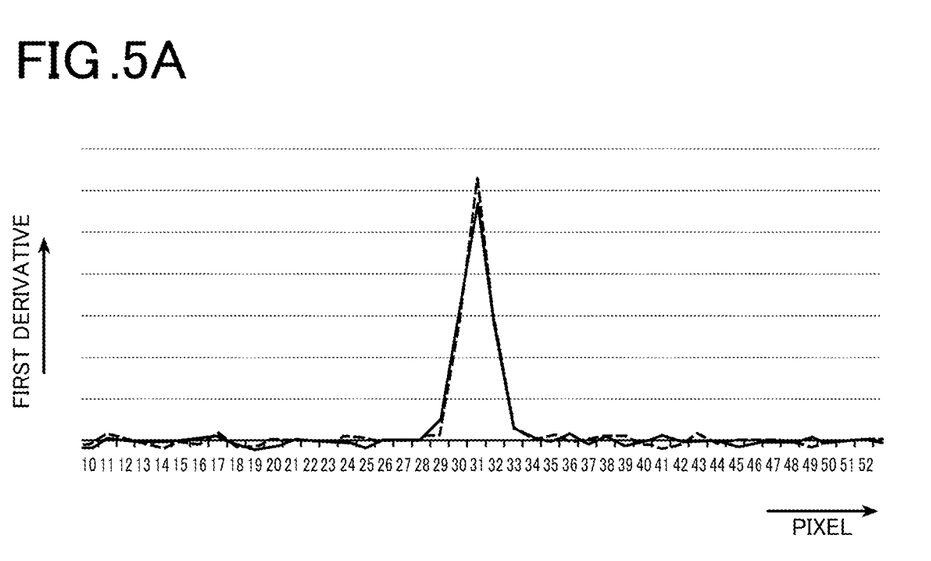
FIGS. 5A and 5B are views showing examples of the first derivatives of the tone values near the edges in the images shown in FIGS. 4A and 4B.
Figure 5B:
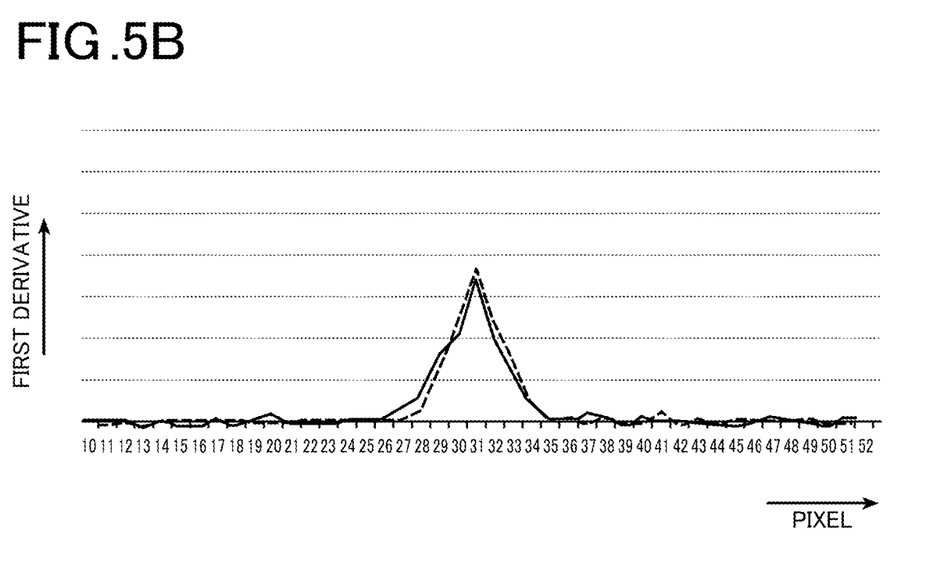

FIGS. 5A and 5B show examples of the first derivatives of the tone values near the edges in the images shown in FIGS. 4A and 4B. FIG. 5A is the first derivatives of the tone values near the edge in image G1 shown in FIG. 4A, and FIG. 5B is the first derivatives of the tone values near the edge in image G2 shown in FIG. 4B.

In the blur-free image G1 read at the focus position in CIS, there is the high peak at the edge and the form of the peak portion is steep (see FIG. 5A). In the blurred image G2, which was read at a position deviating from the focus position of the CIS, the peak is lower and the range of pixels that make up the peak portion is wider and the form of peak portion is more smooth (see FIG. 5B). The controller 23 calculates the blur amount from the relationship between the peak value and the range (the number of pixels) of pixels forming the peak portion.

Next, the controller 23 calculates the curl amount of the sheet based on the calculated blur amount. Specifically, the controller 23 calculates the curl amount based on a pre-created conversion formula that converts the blur amount to the curl amount.

Figure 6:
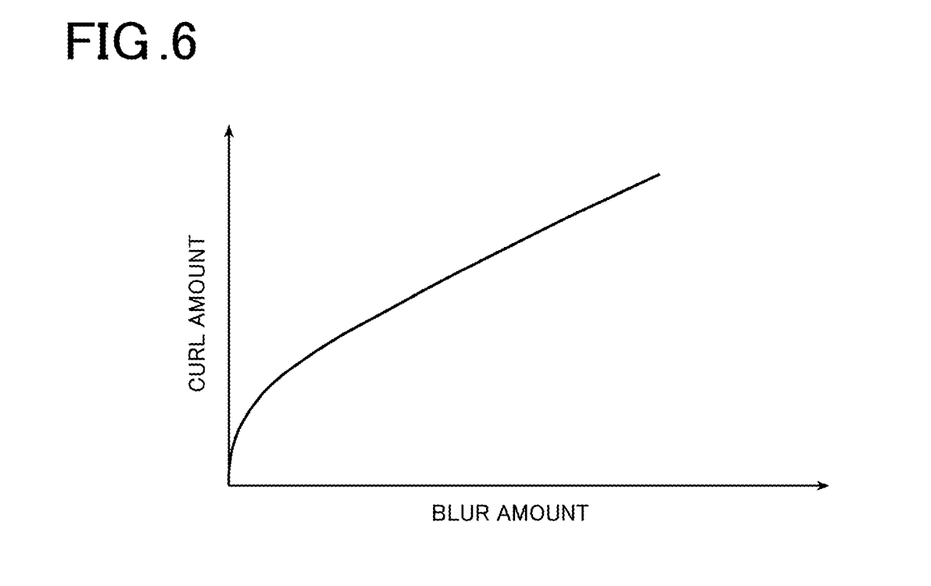
FIG. 6 is a view showing a graphical example of a conversion formula that converts the blur amount to the curl amount.

FIG. 6 shows a graphical example of a conversion formula that converts the blur amount to the curl amount.

The examples shown in FIG. 3 through FIG. 6 above illustrate a configuration in which the leading end of the sheet is read and the curl amount of the leading end of the sheet is calculated. However, the curl amount of rear end of the sheet can also be calculated by performing similar processing to the rear end of the sheet.

In the embodiment, the reader 22 reads the sheet at the timing when the conveyance rollers (upstream conveyance rollers 211, downstream conveyance rollers 212) do not hold therebetween the upstream end in the conveyance direction (leading end) or the downstream end in the conveyance direction (rear end) of the sheet. That is, the reader 22 reads the leading end or the rear end of the sheet, resulting in more accurate calculation of the curl amount of the leading end or the rear end of the sheet.

The post-processing apparatus 30 is equipped with multiple decurlers 31 to straighten the curl of the sheet read by the image reading apparatus 20. The curl of the sheet is corrected according to the nip pressure of the decurlers 31.

The decurler 31 forms a nip by pushing, with an adjusting member 31f, a push shaft 31e to an endless belt 31a wound around a drive roller 31b, a driven roller 31c and a support roller 31d. The decurler 31 adjusts the nip pressure by adjusting the push-in amount of the push shaft 31e based on the curl amount of the sheet output from the controller 23 of the image reading apparatus 20. The nip pressure of the decurler 31 is increased as the curl amount of the sheet is increased. In other words, the decurler 31 increases the corrective force of the sheet by increasing the push-in amount of the push shaft 31e.

Figure 7:
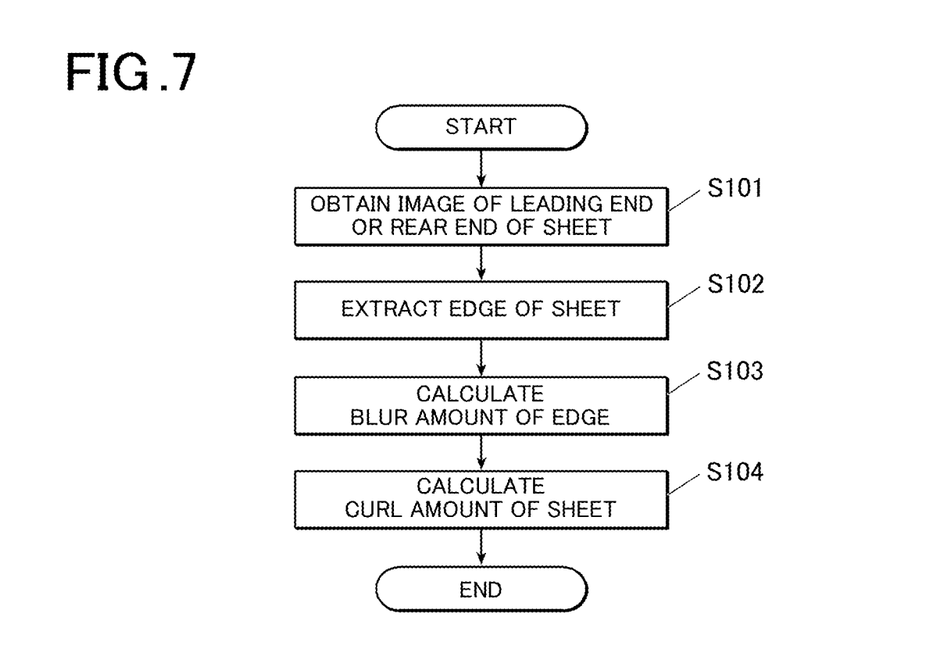
FIG. 7 is a flowchart showing the operation of the image reading apparatus in the embodiment.

Next, the operation of the image reading apparatus in the image forming system 1 in the embodiment will be explained with reference to the flowchart in FIG. 7.

The controller 23 obtains the image of leading or rear end of the sheet read by the reader 22 (step S101).

The controller 23 then analyzes the read image (image of leading end or rear end of the sheet) obtained in step S101, and extracts the edge of the sheet (step S102).

The controller 23 calculates the blur amount of the edge on the basis of the edge extracted in step S102 (step S103).

The controller 23 calculates the curl amount of the sheet on the basis of the blur amount calculated in step S103 (step S104).

The image forming system 1 in the embodiment performs various processes by using the calculated curl amount of the sheet.

For example, the post-processing apparatus 30 corrects the curl of the sheet read by the image reading apparatus 20 (the reader 22) based on the curl amount calculated by the controller 23 of the image reading apparatus 20.

The controller 18 of the image forming apparatus 10 corrects the size of the sheet detected by the sheet size detector 17 based on the curl amount calculated by the controller 23 of the image reading apparatus 20. In other words, the controller 18 functions as the corrector of the present invention. This allows the sheet size that is detected in a shrunken state due to curling of the sheet to be corrected to the correct size.

As described above, the image reading apparatus 20 of the image forming system 1 in the embodiment includes: a conveyor (sheet conveyor 21) that conveys the sheet on which an image is formed by the image forming apparatus 10; a reader 22 that reads the sheet conveyed by the conveyor, by using CIS; and a controller 23 that extracts the edge of the sheet by analyzing the image read by the reader 22, calculates the blur amount of the edge on the basis of the extracted edge, and calculates the curl amount of the sheet on the basis of the calculated blur amount.

Therefore, according to the image reading apparatus 20 in the embodiment, the curl amount of the sheet can be calculated using CIS, which is less expensive and smaller than CCD, and thus the curl of the sheet can be accurately detected while achieving cost reduction and downsizing of the apparatus.

According to the image reading apparatus 20 in the embodiment, the conveyor includes conveyance rollers (upstream conveyance rollers 211 and downstream conveyance rollers 212) that hold the sheet therebetween and convey the sheet. The reader 22 reads the sheet at the timing when the upstream end or downstream end in the conveyance direction of the sheet is not held by the conveyance rollers.

Therefore, according to the image reading apparatus 20 in the embodiment, the curl amount of the sheet can be calculated more accurately because the sheet can be read with the leading end or the rear end curled, rather than with both ends of the sheet in the conveyance direction held between them and the curl stretched out.

According to the image reading apparatus 20 in the embodiment, the controller 23 calculates the blur amount using the first derivatives of the tone values near the edge.

Therefore, according to the image reading apparatus 20 for the embodiment, the blur amount can be calculated by a simple method, so that the curl amount of the sheet can be easily calculated.

According to the image forming system 1 for the embodiment, the post-processing apparatus 30 corrects the curl based on the curl amount calculated by the controller 23.

Therefore, according to the image forming system 1 for the embodiment, the curl of the sheet can be accurately corrected, which improves printing quality while suppressing loading defects.

The image forming system 1 for the embodiment is also equipped with a detector (sheet size detector 17) that detects the size of the sheet and a corrector (controller 18) that corrects the size detected by the detector based on the curl amount calculated by the controller 23.

Therefore, according to the image forming system 1 for the embodiment, the size of the sheet detected in a shrunken state due to curling of the sheet can be corrected to the correct size, which improves the accuracy of the subsequent image forming process and various post-processing processes, thereby improving the print quality.

Though the specific description has been made on the basis of the embodiment according to the present invention, the present invention is not limited to the above embodiment, and modifications can be made within the scope of the present invention.

Modification Example 1

Figure 8:
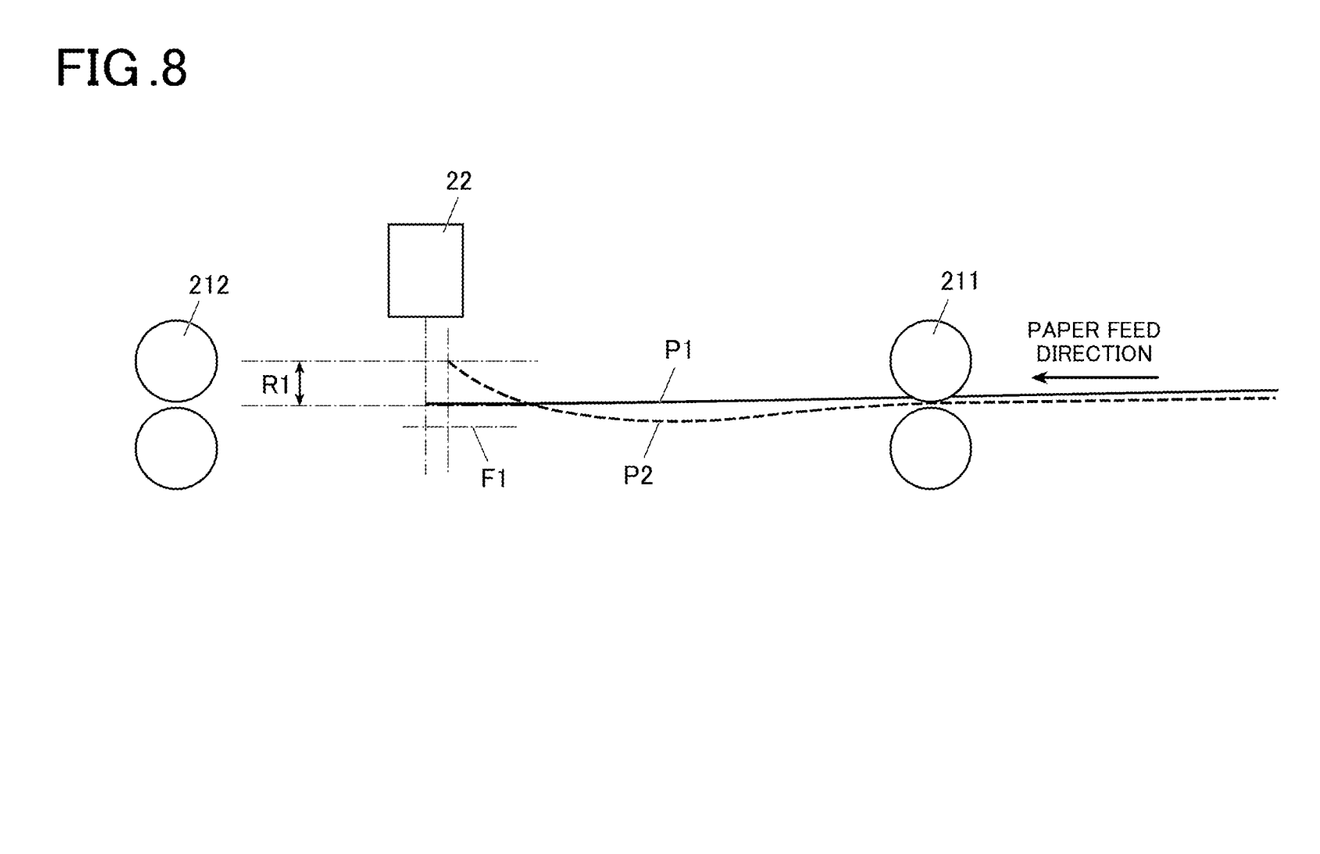
FIG. 8 is a view showing an example of how the sheet conveyor conveys the sheet at a predetermined height deviated from the reader's focus position.

For example, the above embodiment illustrates and explains a configuration in which the sheet conveyor 21 conveys the sheet at the height of the focus position of the reader 22 (see FIG. 3). However, the present invention is not limited to this. For example, as shown in FIG. 8, the sheet conveyor 21 may convey the sheet at a height deviated by a predetermined amount from the focus position of the reader 22.

Figure 9:
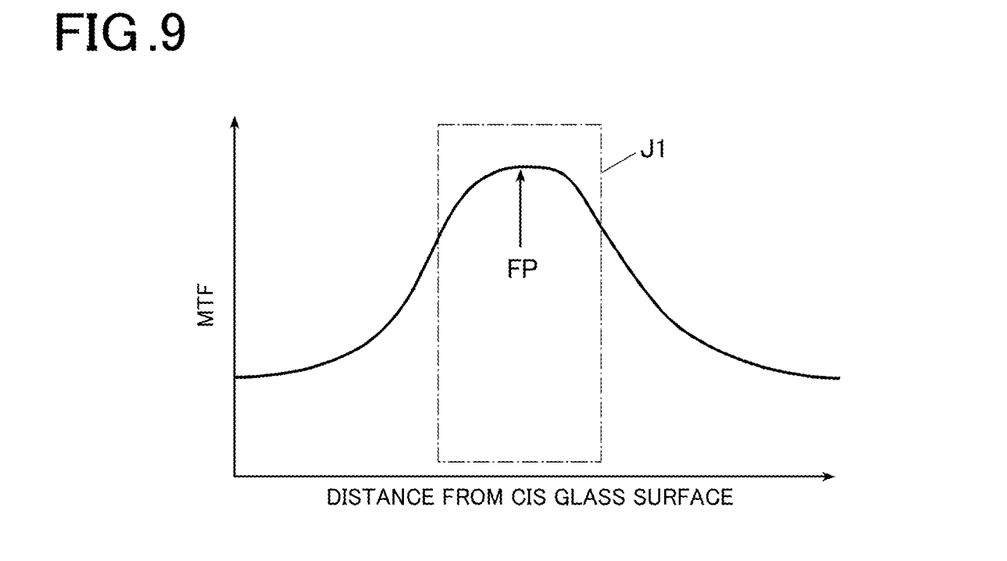
FIG. 9 is a view showing an example in which the MTF variation with respect to distance variation is small near the reader's focus position.
Figure 10:
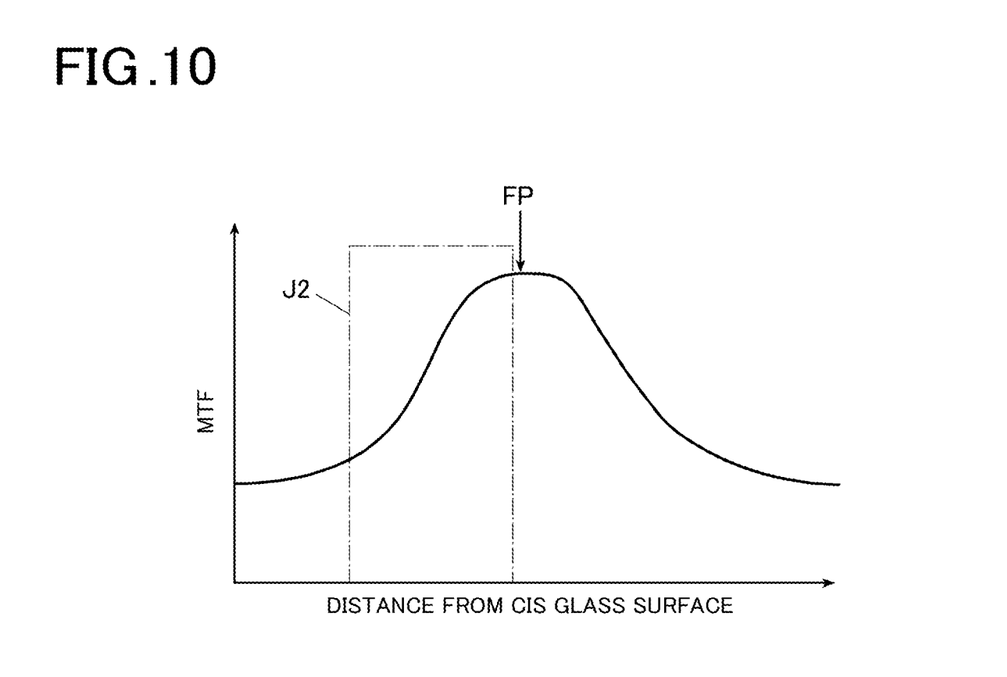
FIG. 10 is a view showing an example in which the MTF variation with respect to distance variation is large near the height deviated by a predetermined amount from the reader's focus position.

In general, there is a tendency that the area around the focus position FP of the reader 22 (CIS) is difficult to blur, as shown in FIG. 9 due to small variation of MTF (Modulation Transfer Function) with respect to variation of distance (distance from CIS glass surface) (see reference mark J1). On the other hand, near the region at the height deviated by a predetermined amount from the focus position FP of the reader 22 (CIS), the variation of MTF with respect to the variation of distance is larger, as shown in FIG. 10 (see reference mark J2). By having the sheet conveyed at a height deviated by a predetermined amount from the focus position, it is possible to increase the variation of MTF with respect to the variation of distance, thus making it easier to generate blur caused by curling. This allows curl to be measured more accurately from the blurred image. The predetermined amount is generally 1 to 2 mm, which is the amount by which the MTF variation with respect to distance variation increases and blurring due to curling is more likely to occur.

Figure 11:
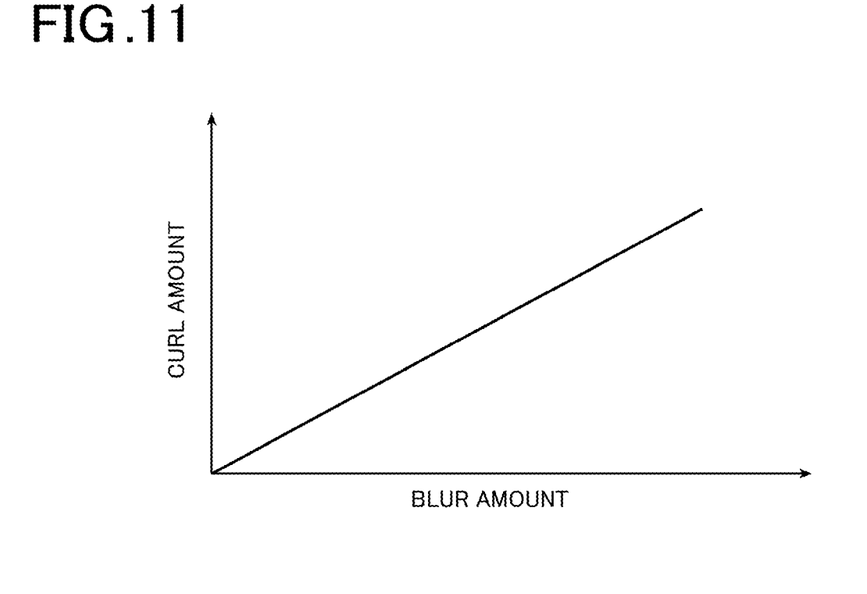
FIG. 11 is a view showing a graphical example of a conversion formula that converts the blur amount to the curl amount when the sheet feeding position is deviated from the reader's focus position by a predetermined amount.

FIG. 11 shows a graphical example of the conversion formula for converting the blur amount to the curl amount when the sheet feeding position is deviated from the focus position of the reader 22 by a predetermined amount.

When the sheet feeding position is deviated by a predetermined amount from the focus position of the reader 22, the curl amount can be accurately calculated even when the curl amount is small, because blur can be generated even when the curl amount is small.

As described above, the conveyor (sheet conveyor 21) conveys the sheet at a height deviated by a predetermined amount from the focus position of the reader 22, which facilitates the generation of blur caused by curl, so that the curl can be measured more accurately from the blurred image.

Modification Example 2

In the above embodiment, the image former 14 of the electrophotographic method is illustrated and explained as an example, but the present invention is not limited to this. For example, instead of the image former 14 of the electrophotographic method, the image former 14A of the inkjet method may be employed, in which ink is ejected from the inkjet head onto the sheet and lands in a desired pattern to form an image on the sheet.

Figure 12:
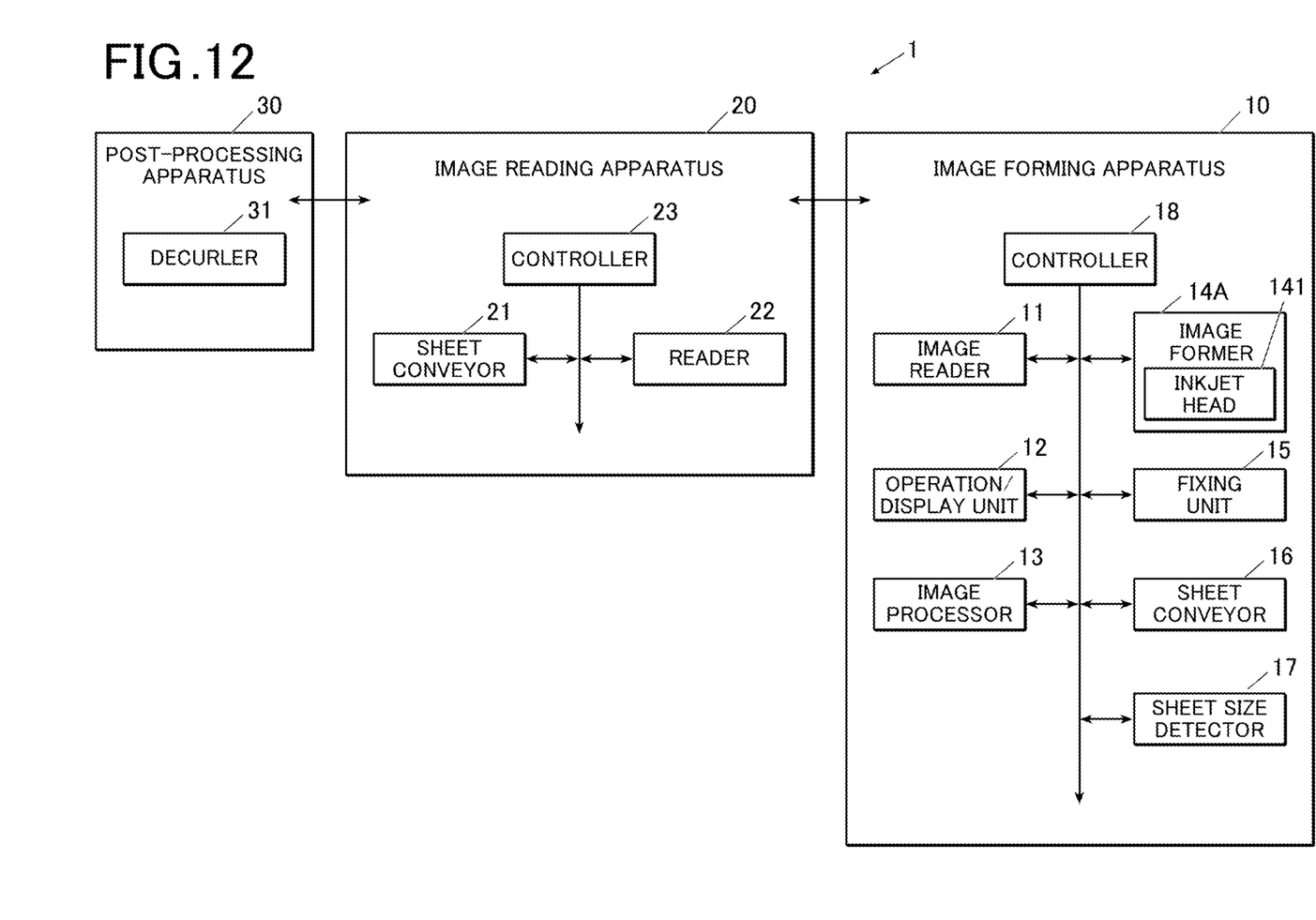
FIG. 12 is a functional block diagram showing the control structure of an image forming system in a modification example 2.

The image former 14A in the modification example 2 includes an inkjet head 141 that forms an image by ejecting the ink onto the sheet as shown in FIG. 12.

If the image former 14A of the inkjet method is used, the curled sheet may collide with the inkjet head 141, damaging the inkjet head 141. The controller 18 of the image forming apparatus 10 in the modification example 2 performs predetermined control to avoid collision between the sheet and the inkjet head 141 based on the curl amount calculated by the controller 23 of the image reading apparatus 20 so that the curled sheet does not collide with the inkjet head 141. In other words, the controller 18 functions as the avoidance controller of the present invention. The predetermined control includes, for example, control to adjust the position of the inkjet head 141 (control to shift the inkjet head 141 away from the sheet), control to adjust the height to convey the sheet (control to shift the sheet feeding position (sheet conveyance path) away from the inkjet head 141, control to convey through a different conveyance path provided away from the inkjet head 141), control to stop conveyance of the sheet, etc.

As described above, since the image forming apparatus 10 includes an image former 14A that forms an image on a sheet by ejecting ink to the sheet from inkjet head 141, and an avoidance controller (controller 18) that performs predetermined control to avoid collision between the sheet and the inkjet head 141 on the basis of the curl amount calculated by the controller 23, it is possible to prevent the collision between the sheet and the inkjet head 141. Thus, it is possible to suppress scratches on the sheet and the image on the sheet while suppressing the damage to the inkjet head 141.

The above embodiment has been described by taking, as an example, the configuration of arranging the sheet size detector 17 downstream in the sheet conveyance direction of the fixing unit 15 on the conveyance path 163 of the image forming apparatus 10. However, the present invention is not limited to this. For example, the sheet size detector 17 may be arranged upstream in the sheet conveyance direction of the fixing unit 15 on the conveyance path 163. The sheet size detector 17 may not be arranged in the image forming apparatus 10, but may be arranged on the conveyance path of the image reading apparatus 20. The sheet size detector 17 may be arranged upstream in the sheet conveyance direction of the multiple decurlers 31 on the conveyance path of the post-processing apparatus 30. When the sheet size detector 17 is arranged in the image reading apparatus 20 or the post-processing apparatus 30, it is not necessary to make the controller 18 of the image forming apparatus 10 function as the corrector of the present invention. For example, the controller 23 of the image reading apparatus 20 may function as the corrector, and the correction result may be output to the controller 18 or the like of the image forming apparatus 10.

By the above configuration, it is possible to correct the size of the sheet detected by the sheet size detector 17 on the basis of the curl amount calculated by the controller 23 of the image reading apparatus 20.

As for the detailed configurations and the detailed operation of the apparatuses forming the image forming system, modifications can be appropriately made within the scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image reading apparatus comprising:
   a conveyor that conveys a sheet on which an image is formed by an image forming apparatus;
   a reader that reads the sheet conveyed by the conveyor, by using a contact image sensor; and
   a first hardware processor that extracts an edge of the sheet by analyzing a read image by the reader, calculates a blur amount of the edge based on the extracted edge, and calculates a curl amount of the sheet based on the calculated blur amount.

2. The image reading apparatus according to claim 1, wherein the conveyor conveys the sheet at a height that is deviated from a focus position of the reader by a predetermined amount.

3. The image reading apparatus according to claim 1, wherein
   the conveyor includes conveyance rollers that hold the sheet between the conveyance rollers and convey the sheet, and
   the reader reads the sheet at a timing when an upstream end in a conveyance direction of the sheet or a downstream end in the conveyance direction is not held between the conveyance rollers.

4. The image reading apparatus according to claim 1, wherein the first hardware processor calculates the blur amount by using a first derivative of a tone value near the edge.

5. An image forming system comprising:
   an image forming apparatus that forms an image on a sheet;
   the image reading apparatus according to claim 1 that reads the sheet on which the image is formed by the image forming apparatus; and
   a post-processing apparatus that corrects a curl of the sheet read by the image reading apparatus.

6. The image forming system according to claim 5, wherein the post-processing apparatus corrects the curl based on the curl amount calculated by the first hardware processor.

7. The image forming system according to claim 5, further comprising:
   a detector that detects a size of the sheet; and
   a second hardware processor that corrects the size detected by the detector based on the curl amount calculated by the first hardware processor.

8. The image forming system according to claim 5, wherein
   the image forming apparatus includes:
      an image former that forms the image on the sheet by ejecting ink to the sheet from an inkjet head; and
      a third hardware processor that performs a predetermined control for avoiding collision between the sheet and the inkjet head based on the curl amount calculated by the first hardware processor.

9. A curl amount calculation method of an image reading apparatus including: a conveyor that conveys a sheet on which an image is formed by an image forming apparatus; and a reader that reads the sheet conveyed by the conveyor by using a contact image sensor, the curl amount calculation method comprising
   controlling that is extracting an edge of the sheet by analyzing a read image by the reader, calculating a blur amount of the edge based on the extracted edge, and calculating a curl amount of the sheet based on the calculated blur amount.

10. A non-transitory computer-readable storage medium storing a program for a computer of an image reading apparatus including: a conveyor that conveys a sheet on which an image is formed by an image forming apparatus; and a reader that reads the sheet conveyed by the conveyor by using a contact image sensor, the program causing the computer to perform controlling that is extracting an edge of the sheet by analyzing a read image by the reader, calculating a blur amount of the edge based on the extracted edge, and calculating a curl amount of the sheet based on the calculated blur amount.

* * * * *